United States Patent [19]
Lockett et al.

[11] Patent Number: 5,699,671
[45] Date of Patent: Dec. 23, 1997

[54] DOWNFLOW SHELL AND TUBE REBOILER-CONDENSER HEAT EXCHANGER FOR CRYOGENIC RECTIFICATION

[75] Inventors: Michael James Lockett, Grand Island; Vijayaraghavan Srinivasan, Williamsville, both of N.Y.

[73] Assignee: Praxair Technology, Inc., Danbury, Conn.

[21] Appl. No.: 584,938

[22] Filed: Jan. 17, 1996

[51] Int. Cl.[6] ............................................. F25D 13/06
[52] U.S. Cl. ........................... 62/63; 62/62; 165/111
[58] Field of Search ......................... 62/645, 646, 651, 62/654, 656, 902, 903, 905; 165/111, 110, 114

[56] References Cited

U.S. PATENT DOCUMENTS

| | | | |
|---|---|---|---|
| Re. 33,026 | 8/1989 | Petit et al. | 62/36 |
| 4,317,786 | 3/1982 | Lagana | 261/112 |
| 4,436,146 | 3/1984 | Smolarek | 165/111 |
| 4,472,325 | 9/1984 | Robbins | 261/96 |
| 4,599,097 | 7/1986 | Petit et al. | 62/36 |
| 5,014,773 | 5/1991 | Beduz et al. | 165/115 |
| 5,071,458 | 12/1991 | Grenier et al. | 62/42 |
| 5,122,174 | 6/1992 | Sunder et al. | 62/24 |
| 5,438,836 | 8/1995 | Srinivasan et al. | 62/36 |

FOREIGN PATENT DOCUMENTS 0469780  2/1992  European Pat. Off.

*Primary Examiner*—Henry A. Bennett
*Assistant Examiner*—Pamela A. O'Connor
*Attorney, Agent, or Firm*—Stanley Ktorides

[57] ABSTRACT

The invention comprises a downflow shell and tube condenser, especially useful for cryogenic rectification, which includes a shell having an upper tube sheet and a lower tube sheet, the shell extending above the upper tube sheet to create a first reservoir. A plurality of heat transfer tubes extend between the upper tube sheet and the lower tube sheet and also pass through the lower tube sheet. Cold liquid entering the heat transfer tubes flows down through the tubes and causes a condensation of vapor that is in contact therewith within the shell. The cold liquid is at least partially vaporized and exits from the lowermost ends of the heat transfer tubes.

14 Claims, 4 Drawing Sheets

5,699,671

DOWNFLOW SHELL AND TUBE REBOILER-CONDENSER HEAT EXCHANGER FOR CRYOGENIC RECTIFICATION

FIELD OF THE INVENTION

This invention relates to an improved shell and tube heat exchanger and, more particularly, to a shell and tube heat exchanger which vaporizes a liquid in a downflow mode versus a condensing vapor. The heat exchanger is particularly applicable as the main reboiler-condenser of a double column cryogenic air separation plant.

BACKGROUND OF THE INVENTION

It is known in the art that proper design of a main condenser used in a double column cryogenic air separation plant is critical to achieving an energy efficient separation. The design and operation of the main condenser is important also so that safety hazards normally associated with boiling of liquid oxygen may be minimized. A safety hazard may arise if oxygen is evaporated to dryness. Under such a condition, trace quantities of soluble hydrocarbons, which are normally present in the compressed feed air stream of the separation facility, may concentrate. Eventually, a combustible mixture may be formed which may react violently and cause damage.

To avoid such boiling to dryness and to further assure uniform distribution of liquid oxygen in the condenser, various techniques have been employed. When a brazed aluminum heat exchanger is used for downflow boiling of oxygen, the oxygen is distributed among many passages. A passage is a flow channel within the heat exchanger, bounded by an individual heat transfer fin and the two adjacent parting sheets. Because there are many hundreds of such passages which carry liquid oxygen, it is difficult to ensure uniform, initial distribution of the liquid oxygen in each passage. If a particular passage receives an insufficient initial amount of liquid oxygen, dryout may occur as the liquid oxygen evaporates during its flow down the passage. Normally, an excess flow rate of liquid oxygen is provided to each passage to prevent such dryout. However, if initial liquid maldistribution is sufficiently significant, the excess flow rate may not solve the problem.

The surface area provided for heat transfer in a brazed aluminum heat exchanger is very large. As a consequence, when all heat transfer surfaces in the passages containing oxygen are wet with the available liquid oxygen, the liquid film thickness is low. Compounding this problem is the fact that as the liquid oxygen flows down the exchanger and its flow rate falls because of evaporation, the film thickness reduces even further. Thus, the risk of dryout increases.

U.S. Pat. No. 5,122,174 to Sunder et al reduces fin density in the oxygen passages in a lower part of a heat exchanger to help alleviate the dryout problem. However, this action reduces the heat transfer area that is available and therefore, reduces the thermal performance of the heat exchanger.

In order to distribute the liquid oxygen to each passage, U.S. Pat. No. Re. 33,026 to Petit et al teaches the use of openings and a packing. By contrast, the aforesaid Sunder et al patent ('174) utilizes spargers and hardway fins. Such distribution devices can become blocked with insulation, debris or solid carbon dioxide, causing a maldistribution of the liquid oxygen.

Further, in brazed aluminum heat exchangers, the small gaps between fins and, particularly, between fin pads can be blocked by debris. Reflux distillation of the downward flowing liquid oxygen above the blockage can lead to a hydrocarbon accumulation and a possible, flammable concentration.

Shell and tube heat exchangers have been employed as reboiler-condensers in the upper column of cryogenic air separation plants (see U.S. Pat. No. 4,436,146 to Smolarek). To minimize the consequences of differential thermal expansion between the tubes and the shell, Smolarek employs a number of smaller shell and tube heat exchanger modules. Additionally, a bellows is employed in the shell of each module to counter differential expansion. In each of those heat exchange modules, nitrogen is introduced within the shell and is condensed against oxygen which convectively circulates through a plurality of tubes from a liquid oxygen pool in which the heat exchanger resides.

A problem with shell and tube heat exchangers such as taught by Smolarek, when they are used in cryogenic air separation units, is that because of the head of liquid oxygen required to drive the circulation, the oxygen pressure at the base of the heat exchanger is increased. The oxygen liquid is therefore subcooled as it enters the heat exchanger tubes. As the liquid oxygen rises, its temperature increases by sensible heat transfer and the pressure falls. Eventually the temperature reaches the saturation temperature and boiling of the oxygen occurs. The net consequence is that thermal performance of the heat exchanger is diminished and the pressure of the condensing nitrogen cannot be reduced below a limiting value.

It is therefore an object of the invention to provide an improved shell and tube condenser wherein a cold liquid is uniformly distributed among the tubes of the condenser.

It is another object of this invention to provide an improved shell and tube condenser wherein the risk of dryout is reduced.

It is yet another object of this invention to provide an improved shell and tube condenser wherein a low temperature difference between oxygen and nitrogen is enabled.

SUMMARY OF THE INVENTION

The invention comprises a downflow shell and tube condenser which includes a shell having an upper tube sheet and a lower tube sheet, the shell extending above the upper tube sheet to create a first reservoir. An inlet introduces a cold liquid into the first reservoir. A plurality of heat transfer tubes extend between the upper tube sheet and the lower tube sheet. Each heat transfer tube has one end which extends through the upper tube sheet into the first reservoir and a peripheral opening positioned above the upper tube sheet. Each heat transfer tube also passes through the lower tube sheet. A vapor which is less cold than the cold liquid is introduced into the shell and about the heat transfer tubes. The cold liquid entering the heat transfer tubes via each of the peripheral openings flows down through the tubes and causes a condensation of the vapor that is in contact therewith within the shell. The cold liquid is at least partially vaporized and exits from the lowermost ends of the heat transfer tubes.

BRIEF DESCRIPTION OF THE DRAWINGS

Other objects, features and advantages will occur to those skilled in the art from the following description of the preferred embodiments and the accompanying drawings, in which.

DETAILED DESCRIPTION OF PREFERRED EMBODIMENTS

Figure 1:
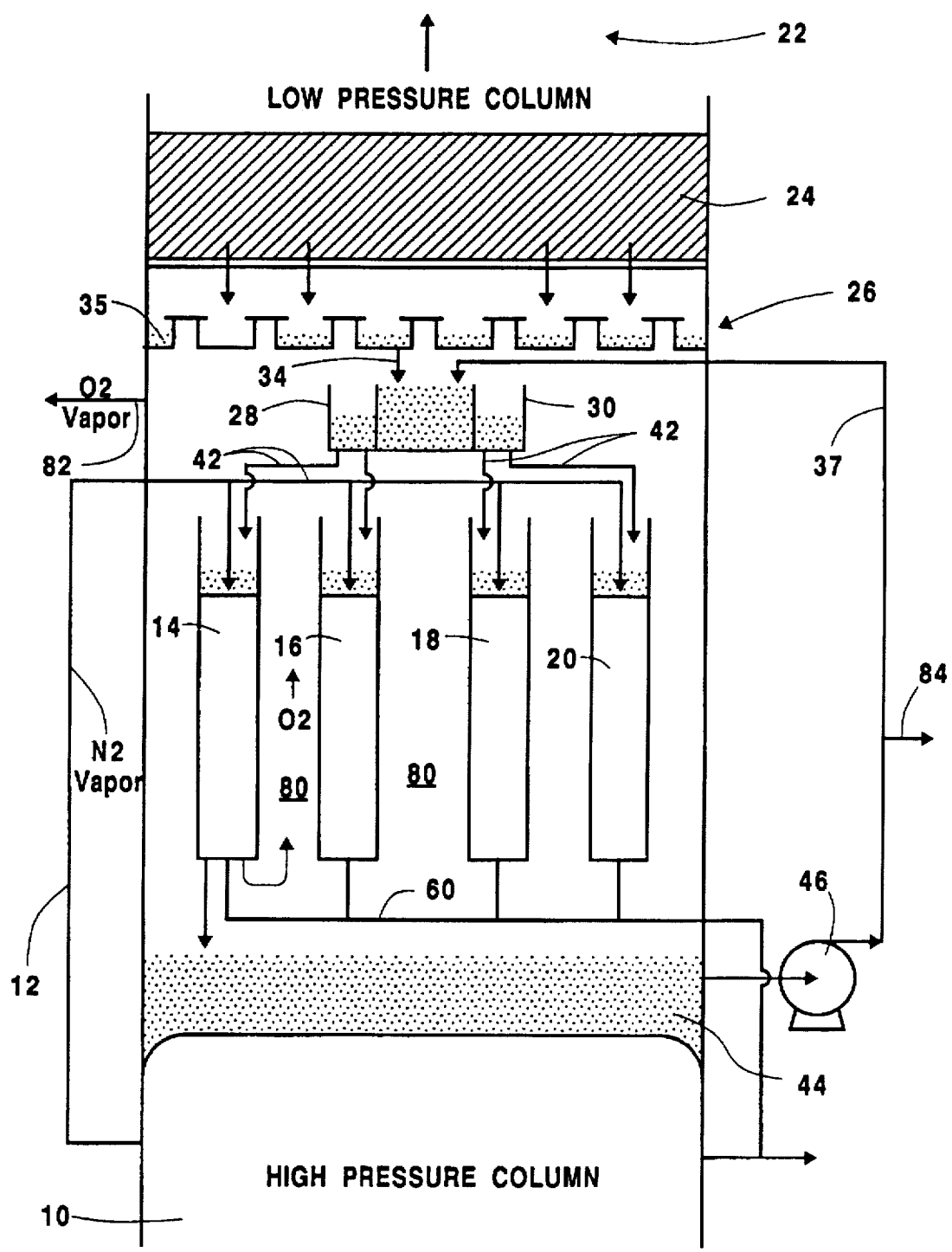
FIG. 1 is a schematic diagram of a first embodiment of the invention including a main condenser in a cryogenic air separation unit.

The invention to be described below is particularly suited for use as a main condenser in a cryogenic air separation plant double column. In such an arrangement (see FIG. 1), a high pressure column 10 pre-separates air and causes a nitrogen vapor to be fed via a conduit 12 to a plurality of shell and tube heat exchangers 14, 16, 18 and 20. A low pressure column 22 completes the separation and feeds a liquid oxygen (or oxygen-rich) stream, via a packing 24, into a main condenser 26 which includes each of the aforementioned shell and tube heat exchangers 14, 16, 18 and 20. While FIG. 1 illustrates four shell and tube heat exchangers, it is to be understood that the number thereof can range from one and up, depending on the desired design configuration of the plant.

Main condenser 26 provides two primary functions: it condenses the nitrogen separated in lower column 10 for subsequent use as a reflux liquid in both high pressure column 10 and low pressure column 22; and it boils the liquid oxygen collected through packing 24 from low pressure column 22.

Figure 2:
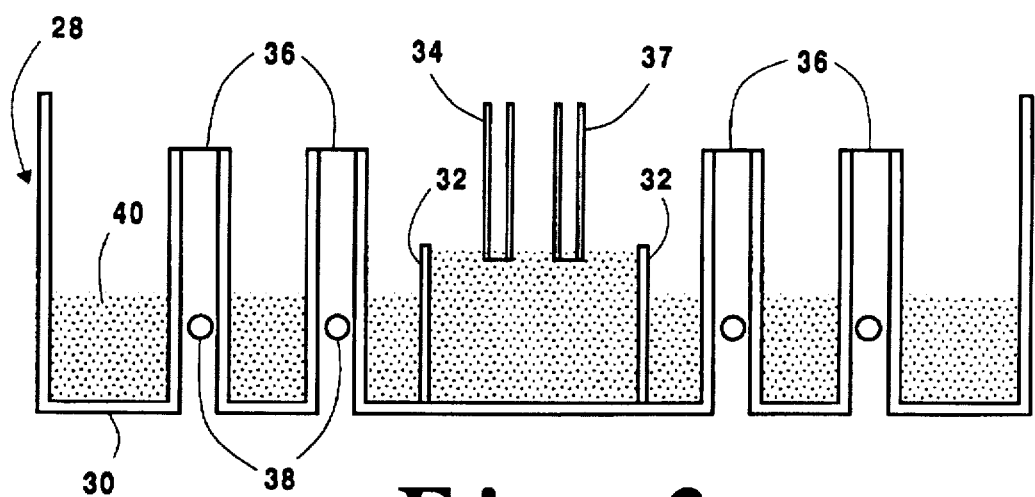
FIG. 2 is a first-stage distributor for distribution of liquid oxygen among a plurality of shell and tube condensers shown in FIG. 1.

The liquid oxygen passing through packing 24 is distributed uniformly among shell and tube heat exchangers 14, 16, 18 and 20 by a two-stage distribution arrangement. A first-stage distribution unit is shown schematically in FIG. 1 and, in further detail in FIG. 2. First stage distribution unit 28 comprises a box or trough 30 with internal baffles 32 to dampen an entering flow of liquid oxygen from packing 24. Such inlet flow occurs through conduit 34 which collects the liquid oxygen from packing 24 via a collection pan or other collection device (e.g. see pan 35 in FIG. 1). In addition to receiving liquid oxygen via conduit 34 from collection pan 35, first stage distributor 28 also receives recirculated liquid oxygen via conduit 37, which is fed from a liquid oxygen reservoir 44 via a pump 46.

Open risers 36 (FIG. 2) extend up from the floor of box 30 and convey liquid oxygen to each shell and tube heat exchanger. Risers 36 have a hole or slot 38 in their sides, through which liquid oxygen 40 flows via pipes 42 to the shell and tube exchangers.

Figure 3:
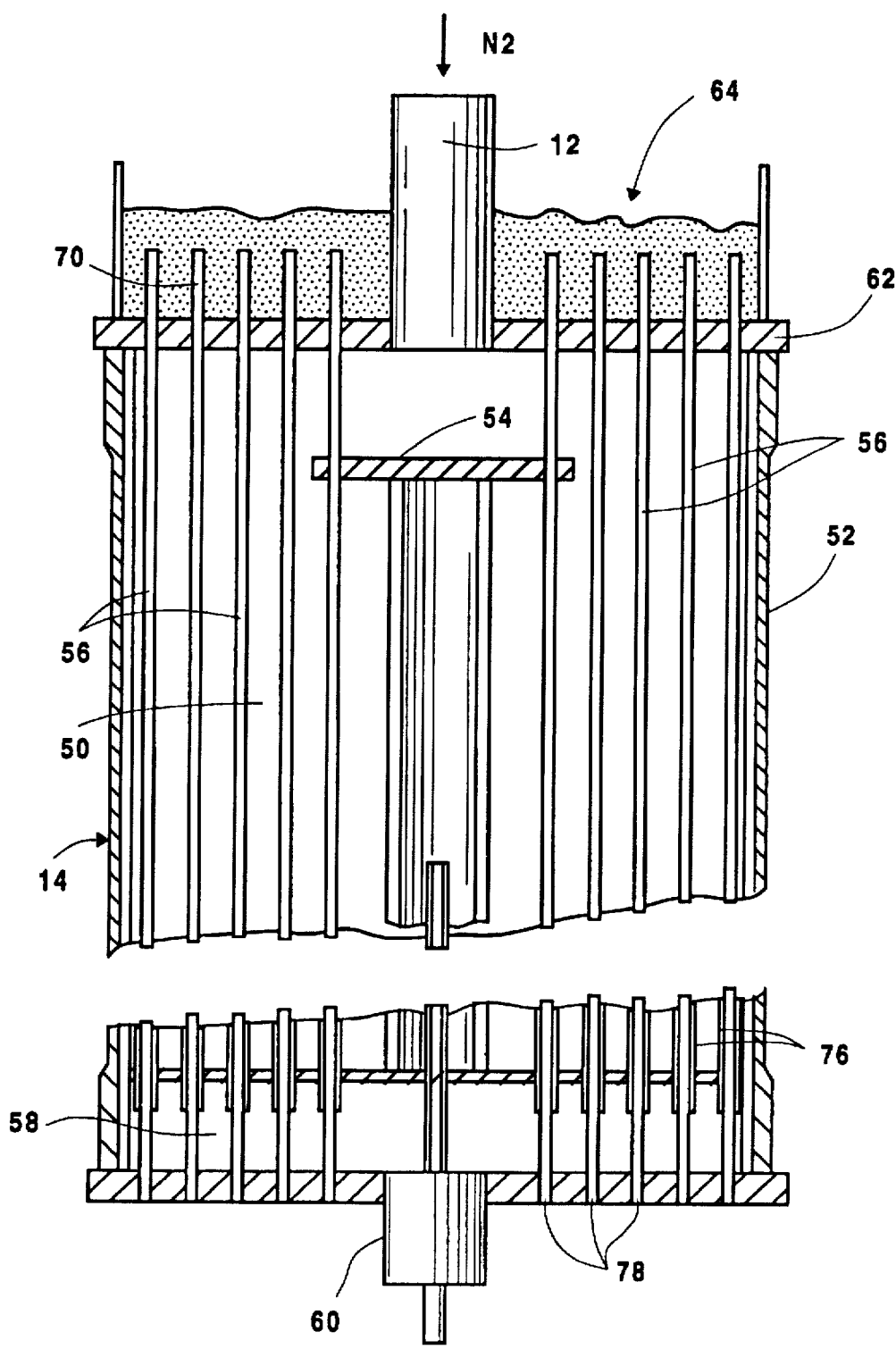
FIG. 3 illustrates details of a shell and tube condenser shown in FIG. 1.

Referring now to FIG. 3, a shell and tube heat exchanger 14 is illustrated that is constructed in accordance with the invention. Nitrogen vapor is introduced via conduit 12 into interior region 50 within shell 52. As the nitrogen vapor passes into region 50, it is diffused by plate 54 and surrounds each of tubes 56. The nitrogen vapor condenses against tubes 56 and the resulting liquid flows downwardly into collection sump 58 and flows outward therefrom via conduit 60 as liquid nitrogen. As shown in FIG. 1, a portion of the liquid nitrogen is fed back into high pressure column 10.

Figure 4:
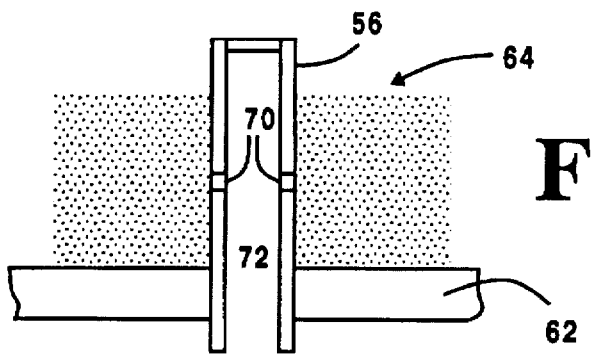
FIGS. 4 and 4a illustrate the uppermost end of each tube used with the shell and tube condenser of FIG. 3.
Figure 4A:
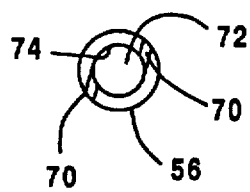
Figure 4B:
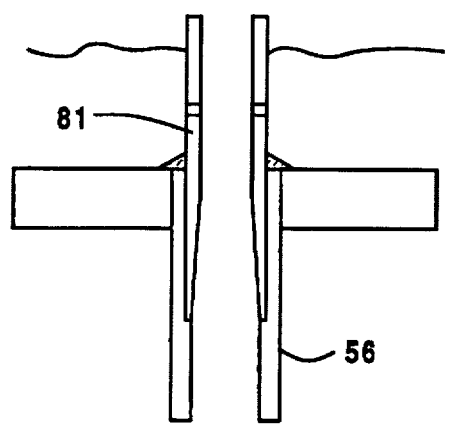
FIG. 4b illustrates an alternative arrangement of the uppermost ends of the tubes used with the shell and tube condenser of FIG. 3.

Shell 52 extends above upper tube sheet 62 and creates a reservoir 64 for collection of liquid oxygen from first stage distributor 28. Optionally, reservoir 64 can be formed by adding a separate shell extension to tubesheet 62. Each of tubes 56 extends upwardly through tube sheet 62 and into reservoir 64. As shown in FIG. 3 and FIG. 4, the uppermost end of each of tubes 56 is sealed, but optionally can be open and extend sufficiently far above tube sheet 62 to extend above the surface of liquid 64. (See FIG. 4b)

Each tube 56 further includes one or more apertures 70 which enable flow of liquid oxygen from reservoir 64 into the internal lumen 72 within each tube 56. It is preferred that the orientation of apertures 70 be such as to introduce liquid oxygen into lumen 72 in a tangential manner onto internal surface 74 of a tube 56 (see FIGS. 4a and 4b).

Internal surface 74 of each of tubes 56 is processed to produce a porous boiling surface. The term "porous boiling surface" means a thin metallic film possessing high porosity and large interstitial surface area which is metallurgically bonded to the metal substrate by means such as sintering of a metallic powder coating. Porous boiling surfaces are further described in U.S. Pat. No. 3,384,154 to Milton.

As further shown in FIG. 3, each tube 56 extends into reservoir 64 and positions apertures 70, preferably, approximately one inch above tube sheet 62 so that debris is not induced to flow through apertures 70 and cause blockage thereof. Because apertures 70 are cut at an angle through the wall of each tube 56, the liquid jet passing therethrough impinges tangentially onto the porous internal surface 74 and wetting thereof is encouraged. The number and size of apertures 70 in each tube 56 depends upon the flow rate of liquid oxygen to each tube 56. Typically, two or four holes of about 0.125" diameter are preferably employed. Flutes 76 are positioned about portions of tubes 56 to improve the condensation heat transfer.

As the liquid oxygen flows downwardly through tubes 56, heat transfer occurs from the nitrogen vapor which is present within region 50 of shell 52. As a result, nitrogen vapor condensation occurs. A concurrent boiling of the liquid oxygen results on the porous inner surface areas 74 within tubes 56. Residual liquid oxygen and oxygen vapor pass out through the open bottoms 78 of tubes 56. The liquid oxygen flows into reservoir 44 and the oxygen vapor passes into interior region 80 within main condenser 26 (see FIG. 1) and is collected via output pipe 82. The liquid oxygen in reservoir 44 is recirculated in part to first stage distributor 28 via conduit 37 and is output in part via conduit 84.

The welding of tubes 56 to tube sheet 62 may be difficult if the tubes extend substantially above the upper surface of tube sheet 62. To overcome this potential problem (see FIG. 4b), tubes 56 may be terminated flush with the upper surface of tube sheet 62 and welded in the normal manner. Thereafter, a distributor tube 81 is inserted into the upper opening of each tube 56 and is then roller swaged outward so as to be pressure fit into the upper opening. In this arrangement, each distributor tube 81 is preferably open at its upper end and extends sufficiently above the liquid surface to prevent liquid flow down through the opening. In operation, vapor flows mainly downward in the direction of liquid flow, but a small proportion also flows upwardly, countercurrent to the liquid flow.

Figure 5:
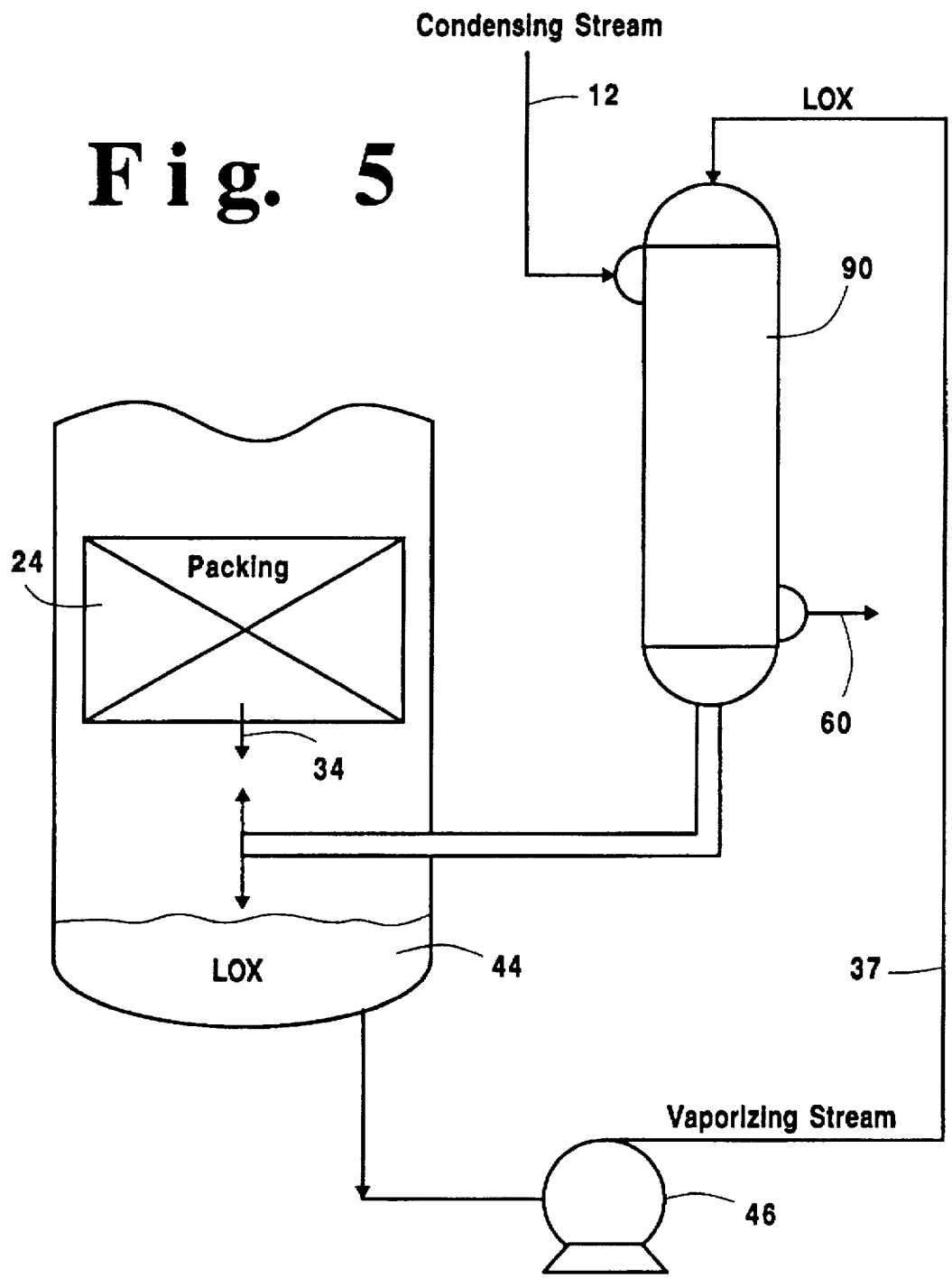
FIG. 5 is a schematic diagram of a second embodiment of the invention.

In FIG. 5, an embodiment of the invention is shown wherein the height and cost of the low pressure column is reduced by locating the heat exchanger 90 outside the shell of the column. If multiple heat exchangers 90 are used, all located outside the shell of the column, it is necessary to distribute the liquid uniformly to each heat exchanger 90 by using a first stage distributor similar to that shown in FIG.

1. The distillation column internals are preferably packing, but trays may also be used.

As indicated above, it is important that the liquid oxygen is distributed uniformly to each heat transfer tube 56. The liquid to vapor mass ratio leaving each heat transfer tube should be in the range of 0.5:10, preferably 1.0:4.0 and most preferably about 4.0 to ensure complete wetting of the porous surface with liquid oxygen. As the design value of the exiting liquid to vapor ratio is reduced, a more stringent requirement is placed on the required uniformity of liquid distribution.

The downflow structure of the invention substantially reduces the head of liquid oxygen required to cause oxygen circulation through pipes 56. The system is designed so that sufficient head is created by reservoir 64 to ensure cocurrent downward flow of both liquid oxygen and oxygen vapor within tubes 56. The invention assures substantially uniform distribution of liquid oxygen in tubes 56, thereby reducing the potential for dryout conditions. Further, the two-stage distribution of liquid oxygen to tubes 56 enables a relatively high flow rate of liquid oxygen to each tube 56. This enables larger apertures to be used in the flow distribution arrangement than is possible in prior art brazed aluminum heat exchanger and renders the system more resistant to blockage.

Specific features of the invention are shown in one or more of the drawings for convenience only, as each feature may be combined with other features in accordance with the invention. Alternative embodiments will be recognized by those skilled in the art and are intended to be included within the scope of the appended claims.

We claim:

1. A downflow shell and tube condenser comprising:
   a shell having an upper tube sheet and a lower tube sheet, said shell extending above said upper tube sheet to create a first reservoir;
   means for introducing a cold liquid into said first reservoir;
   a plurality of heat transfer tubes extending between said upper tube sheet and said lower tube sheet, each heat transfer tube having one end which extends through said upper tube sheet and into said first reservoir and further having an aperture positioned above said upper tube sheet;
   means for introducing a vapor, which is less cold than said cold liquid into said shell and about said heat transfer tubes, whereby said cold liquid entering said heat transfer tubes via each said aperture and flowing down therethrough causes a condensation of said vapor within said shell to a liquid, said cold liquid, in turn, being at least partially converted to a vapor; and
   means for recovering said liquid.

2. The downflow shell and tube condenser as recited in claim 1, wherein each said heat transfer tube is sealed at its uppermost end.

3. The downflow shell and tube condenser as recited in claim 1, wherein each said heat transfer tube is open at its uppermost end and extends above a surface of said cold liquid in said first reservoir.

4. The downflow shell and tube condenser as recited in claim 1, wherein each said aperture in a heat transfer tube is oriented to introduce said cold liquid into an interior lumen in said heat transfer tube in a tangential manner to enable tangential flow of said cold liquid about an internal surface of said heat transfer tube.

5. The downflow shell and tube condenser as recited in claim 1 wherein at least a portion of said interior surface of each said lumen has a porous boiling surface.

6. The downflow shell and tube condenser as recited in claim 1, wherein said means for introducing a cold liquid into said first reservoir comprises a first stage distribution unit for uniformly distributing said cold liquid among a plurality of said shell and tube condensers, said first stage distribution unit including a trough into which an inflow of said cold liquid occurs, said trough including baffles for controlling said inflow of said cold liquid, and said first stage distribution unit further having a plurality of risers extending thereinto, each said riser including an aperture positioned above a floor of said first stage distribution unit which enables said inflow of said cold liquid into a riser, each said riser connected via conduit means to a first reservoir of a shell and tube condenser.

7. The downflow shell and tube condenser as recited in claim 6, wherein each said aperture positioned in a heat transfer tube is located a distance above said upper tube sheet.

8. The downflow shell and tube condenser as recited in claim 1, wherein said cold liquid is liquid oxygen and said vapor is gaseous nitrogen.

9. A cryogenic air separation unit including a downflow shell and tube condenser and a low pressure distillation column, said condenser comprising:
   a shell located within said low pressure distillation column and having an upper tube sheet and a lower tube sheet, said shell extending above said upper tube sheet to create a first reservoir;
   means for introducing liquid oxygen into said first reservoir;
   a plurality of heat transfer tubes extending between said upper tube sheet and said lower tube sheet, each heat transfer tube having one end which extends through said upper tube sheet and into said first reservoir and further having an aperture positioned above said upper tube sheet;
   means for introducing into said shell and about said heat transfer tubes, a nitrogen vapor which is less cold than said liquid oxygen, said liquid oxygen entering said heat transfer tubes via each said aperture and flowing down said heat transfer tubes thereby allowing condensation of said nitrogen vapor within said shell to a nitrogen liquid, said liquid oxygen, in turn, being at least partially converted to an oxygen vapor; and
   means for recovering both liquid and gaseous products.

10. An air separation unit as recited in claim 9, wherein each said aperture in each heat transfer tube is oriented to introduce said liquid oxygen into an interior lumen in each heat transfer tube in a tangential manner to enable tangential flow of said cold liquid about an internal surface of each heat transfer tube.

11. An air separation unit as recited in claim 9 wherein at least a portion of said interior surface of each said lumen has a porous boiling surface.

12. A cryogenic air separation unit including a downflow shell and tube condenser and a low pressure distillation column, said condenser comprising:

a shell located external to said low pressure distillation column and having an upper tube sheet and a lower tube sheet, said shell extending above said upper tube sheet to create a first reservoir;

means for introducing liquid oxygen from said low pressure column into said first reservoir;

a plurality of heat transfer tubes extending between said upper tube sheet and said lower tube sheet, each heat transfer tube having one end which extends through said upper tube sheet and into said first reservoir and further having an aperture positioned above said upper tube sheet;

means for introducing into said shell and about said heat transfer tubes, a nitrogen vapor which is less cold than said liquid oxygen, said liquid oxygen entering said heat transfer tubes via each said aperture and flowing down said heat transfer tubes thereby allowing condensation of said nitrogen vapor within said shell to a nitrogen liquid, said liquid oxygen, in turn, being at least partially converted to an oxygen vapor; and means for recovering said liquid nitrogen.

13. An air separation unit as recited in claim 12, wherein each said aperture in a heat transfer tube is oriented to introduce said liquid oxygen into an interior lumen in said heat transfer tube in a tangential manner to enable tangential flow of said cold liquid about an internal surface of said heat transfer tube.

14. An air separation unit as recited in claim 12 wherein at least a portion of said interior surface of each said lumen exhibits a porous boiling surface.

* * * * *